United States Patent
Murata

(12) 
(10) Patent No.: US 6,240,593 B1
(45) Date of Patent: Jun. 5, 2001

(54) VEHICLE WIPER DEVICE FOR OPENABLE WINDOW GLASS

(75) Inventor: Shinji Murata, Hamamatsu (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 09/505,706

(22) Filed: Feb. 17, 2000

(30) Foreign Application Priority Data

Feb. 24, 1999 (JP) .................................................. 11-046206
Dec. 24, 1999 (JP) .................................................. 11-366840

(51) Int. Cl.[7] .................................. B60S 1/58; B60S 1/18
(52) U.S. Cl. ................ 15/250.3; 15/250.31; 15/250.001; 296/96.2; 296/96.17; 318/DIG. 2
(58) Field of Search ............................. 15/250.3, 250.31, 15/250.001, 250.34, 250.16, 250.17; 296/96.13, 96.17, 96.2, 96.21; 318/DIG. 2

(56) References Cited

U.S. PATENT DOCUMENTS 2,046,108 * 6/1936 Drew ..................................... 15/250.3
5,722,108 * 3/1998 Sakyo et al. ......................... 15/250.3

FOREIGN PATENT DOCUMENTS

2728088  *  1/1978  (DE) ..................................... 15/250.3
3313057  * 10/1984  (DE) ..................................... 15/250.3
 353336  *  7/1931  (GB) ................................... 15/250.17
1448892      8/1976  (GB) .
2-18761      2/1990  (JP) .
B1-2963685   8/1999  (JP) .

* cited by examiner

Primary Examiner—Gary K. Graham
(74) Attorney, Agent, or Firm—Law Office of David G. Posz

(57) ABSTRACT

In a wiper device for openable window glass, a pivot shaft having a wiper arm and blade assembly is rotatably held by the window glass. An actuator is fixed to the vehicle body for driving the pivot shaft and is engageable and disengageable with the pivot shaft so as to transmit and interrupt the driving force of the actuator to the pivot shaft. A controller is connected in circuit with the actuator for controlling an operation of the actuator. A switch element is connected in circuit with the controller for generating a first signal when the window glass is opened and a second signal when the window glass is closed. With the wiper device mentioned above, the controller controls the actuator in such a manner that driving the pivot shaft is stopped immediately upon receiving the first signal and is started with a certain time delay after receiving the second signal.

11 Claims, 10 Drawing Sheets

VEHICLE WIPER DEVICE FOR OPENABLE WINDOW GLASS

CROSS REFERENCE TO RELATED APPLICATIONS

This application is based upon and claims the benefit of priority of Japanese Patent Applications No. H.11-46206 filed on Feb. 24, 1999 and No. H. 11-366840 filed on Dec. 24, 1999, the contents of which are incorporated herein by reference.

BACKGROUND OF THE INVENTION

1. Field of the Invention

The present invention relates to a vehicle wiper device for an openable window glass, in particular, applicable to vehicles in which the wiper device is in wiping contact with a glass of an openable rear window (glass hatch type vehicles).

2. Description of Related Art

Recently, there are vehicles such as station wagon or hatchback type vehicles in which a rear window glass at the tailgate is openable independently of an openable rear door for loading luggage. A conventional wiper device has been attached directly to the rear window glass for wiping a surface of the glass.

However, among component parts constituting the wiper device, an actuator is, in particular, heavy and bulky. Thus, a large operation force for opening the rear window is required. On the other hand, when the rear window is abruptly closed to hit the rear door with a large impact, the glass may be strongly stressed at a portion where the actuator is fixed so that the glass may be broken. Further, as the wiper device having the actuator is large, the wiper device is likely to interrupt the rear view. Furthermore, it becomes relatively complicated to supply an electric power to a wiper motor, as a power source of the actuator, in case that the actuator is fixed to the window glass.

To cope with these drawbacks, there has been proposed a wiper device in which the actuator is fixed to the rear door and the pivot shaft to be concentrically fixed with a wiper arm is rotatably held by the window glass such that the pivot shaft may be engaged with and driven by the actuator only when the window is closed.

In the wiper device mentioned above, the actuator power source drives a disk plate mounted on an output shaft thereof to reciprocatingly rotate within a predetermined rotation angle. The disk plate is provided with a connecting hole at a position radially outwardly offset from a center axis of the output shaft. On the other hand, the pivot shaft is rotatably held in a pivot holder secured to the window glass so as to be concentrically with the output shaft. A lever is fixed to an end of the pivot shaft on a side of the actuator and the lever is provided with a connecting pin to be fitted into the connecting hole of the disk plate.

When the window is closed and the connecting pin is fitted into the connecting hole, the disk plate and the lever are engaged with each other so that the driving force of the actuator may be transmitted to the pivot shaft. The oscillation movement of the disk plate within the predetermined rotation angle according to an operation of the actuator power source causes the lever to simultaneously oscillate so that the pivot shaft may be rotated to make the wiper arm move within the predetermined rotation angle and make a wiper blade attached to a leading end of the wiper arm move through an arcuate path on the widow glass surface.

However, the wiper device has a problem that, when the window is opened, at least a part of the disk plate is exposed out of a window aperture because of the construction that the disk plate and the lever are engaged with each other on closing the window. From the foregoing, the oscillation movement of the disk plate according to the operation of the actuator even when the window is kept opened does not give a driver or operator a favorable feeling.

On the other hand, when the widow is closed during the operation of the actuator, the oscillation movement of the disk plate brings frictional noises, unusual loads or resistance on engaging the connecting pin with the connecting hole.

For the purpose of the problem, it may be contemplated to incorporate a switch in the wiper motor electrical circuit such that opening the window may open the switch to break the wiper motor circuit and closing the window may close the switch to complete the wiper motor circuit. As a result, the actuator is driven only when the window is closed and, that is, only when the switch is closed. However, with the wiper device mentioned above, the driver or operator may be surprised and may not have a favorable feeling by a sudden movement of the wiper arm and blade starting as soon as the window is closed and, simultaneously, the switch is closed.

SUMMARY OF THE INVENTION

The present invention has been made in view of the above mentioned problem, and an object of the present invention is to provide a wiper device for a window glass openable relative to a vehicle body in which a wiping operation of a wiper arm and blade assembly may stop immediately upon opening the wind glass and start with a certain time delay after closing the window glass. According to the wiper device mentioned above, a driver or operator, who once opened and, then, closes the window glass, may not have an unfavorable feeling, since the wiper arm and blade assembly does not move immediately upon closing the window glass but move with a certain time delay after closing the window glass.

To achieve the above object, the wiper device is composed of a pivot shaft having a wiper arm and blade assembly at an end thereof and a pivot shaft coupling member at another end thereof, a pivot holder secured to the window glass for rotatably holding the pivot shaft, an actuator fixed to the vehicle body for driving the pivot shaft so that the wiper arm and blade assembly may wipe a surface of the window glass. The actuator is provided with an actuator power source for generating a driving force and an actuator coupling member engageable and disengageable with the pivot shaft coupling member so as to transmit and interrupt the driving force of the actuator power source to the pivot shaft. The wiper device is further provided with control means connected in circuit with the actuator for controlling an operation of the actuator and a switch element connected in circuit with the control means for generating a first signal when the window glass is opened and a second signal when the window glass is closed.

With the wiper device mentioned above, the control means controls the actuator in such a manner that driving the pivot shaft is stopped immediately upon receiving the first signal and is started with a certain time delay after receiving the second signal.

Preferably, the control means has time delay means connected in circuit with the switch element. The time delay means is so operative that an electric power supply to the actuator power source may be stopped immediately upon receiving the first signal and may be started with a predetermined time delay after receiving the second signal.

The time delay means may be a timer circuit assembled in the actuator and connected in circuit in series between a controller of the control means and a wiper motor of the actuator power source so that the circuit in series may break immediately when the timer circuit receives the first signal and complete with a predetermined time delay when the timer circuit receives the second signal.

As an alternative embodiment, the time delay means may be incorporated in the controller for software processing so that the electric power supply to the wiper motor may be stopped immediately when the controller receives the first signal and be started with a predetermined time delay when the controller receives the second signal.

In case of the alternative embodiment, it is not necessary to employ separately the timer circuit to be connected in circuit between the controller and the wiper motor, though an additional wire harness for transmitting the first and second signals between the controller and the switch element is required.

Further, in place of having the time delay means control the electric power supply to the wiper motor, the time delay means may control an electrical clutch disposed at the actuator to engage and disengage with the actuator coupling member. The time delay means controls the electrical clutch in such a manner that the driving force of the actuator power source to the actuator coupling member may be interrupted immediately upon receiving the first signal and be transmitted with a predetermined time delay after receiving the second signal.

In this case, the electrical clutch is located between the wiper motor and the actuator coupling member for transmitting and interrupting an output of the wiper motor to the actuator coupling member. The time delay means may be a timer circuit assembled in the actuator and connected in circuit in series between a controller of the control means and the electrical clutch, in parallel to which the controller is connected in circuit with the wiper motor. The circuit in series for energizing the electrical clutch may be broken immediately when the timer circuit receives the first signal for interrupting a transmission of the output of the wiper motor to the actuator coupling member and be stopped with a predetermined time delay after the timer circuit receives the second signal for allowing the transmission of the output of the wiper motor to the actuator coupling member.

Alternatively, the time delay means may be incorporated in the controller for software processing so that the controller may stop energizing the electrical clutch immediately after receiving the first signal and start energizing the electrical clutch with a predetermined time delay after receiving the second signal.

Furthermore, it is more preferable to dispose the switch element at the actuator, which is operative in response to a movement of the actuator coupling member relative to the actuator power source. The switch element generates the first signal when the actuator coupling member is moved through a predetermined position in a direction away from the actuator power source and the second signal when the actuator coupling member is moved back through the predetermined position in a direction near to the actuator power source.

Alternatively, the switch element may be disposed at the vehicle door, which is operative in response to a movement of the window glass relative to the vehicle body. The switch element generates the first signal when the wind glass is moved through a predetermined position in a direction away from the vehicle body and the second signal when the wind glass is moved back through the predetermined position in a direction near to the vehicle body.

The switch element may be commonly used as a switch for visually displaying at an instrument panel to caution a state that the wind glass is opened.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
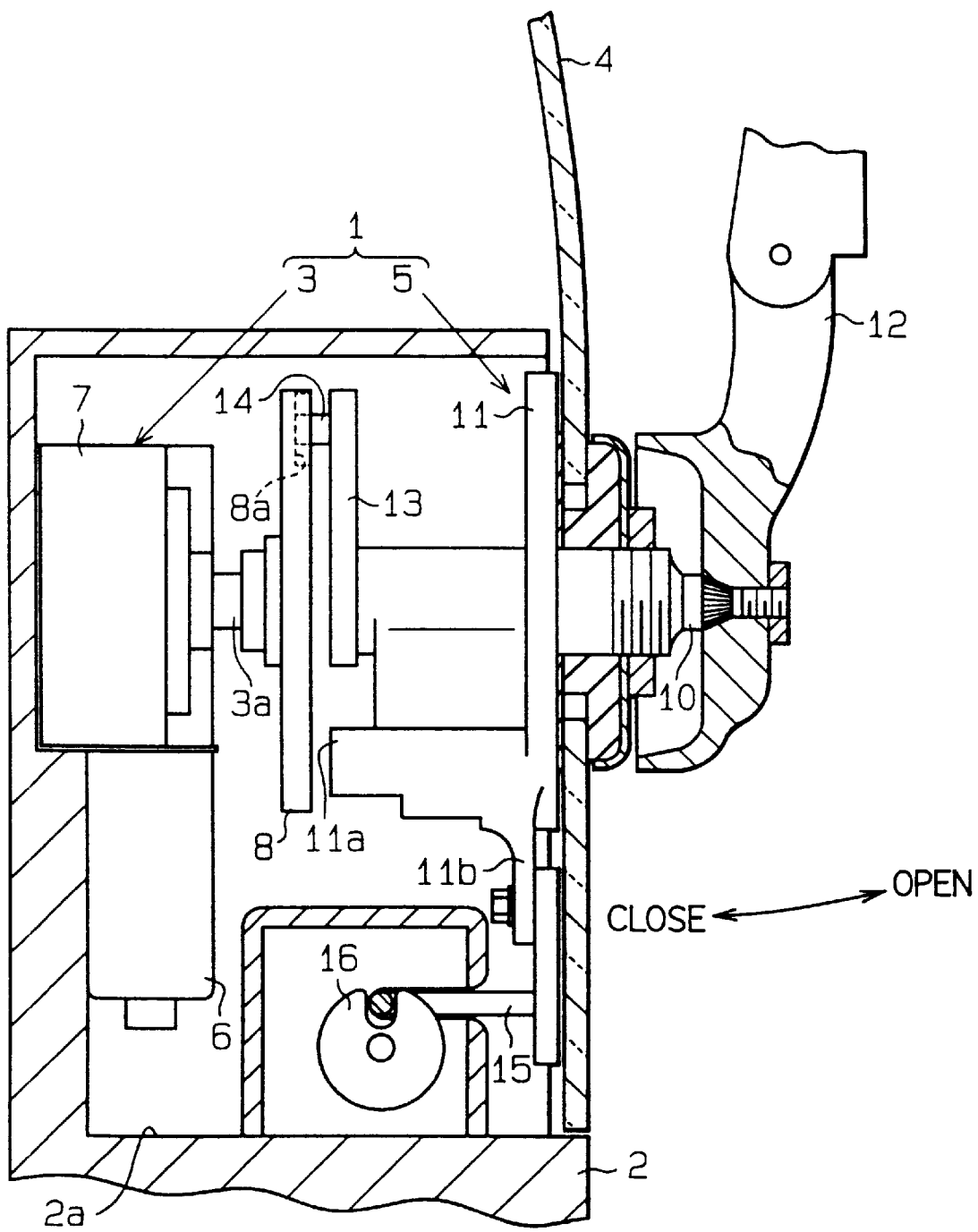
FIG. 1 is a cross sectional view of the wiper device according to a first embodiment of the present invention when a window glass is closed.
Figure 2:
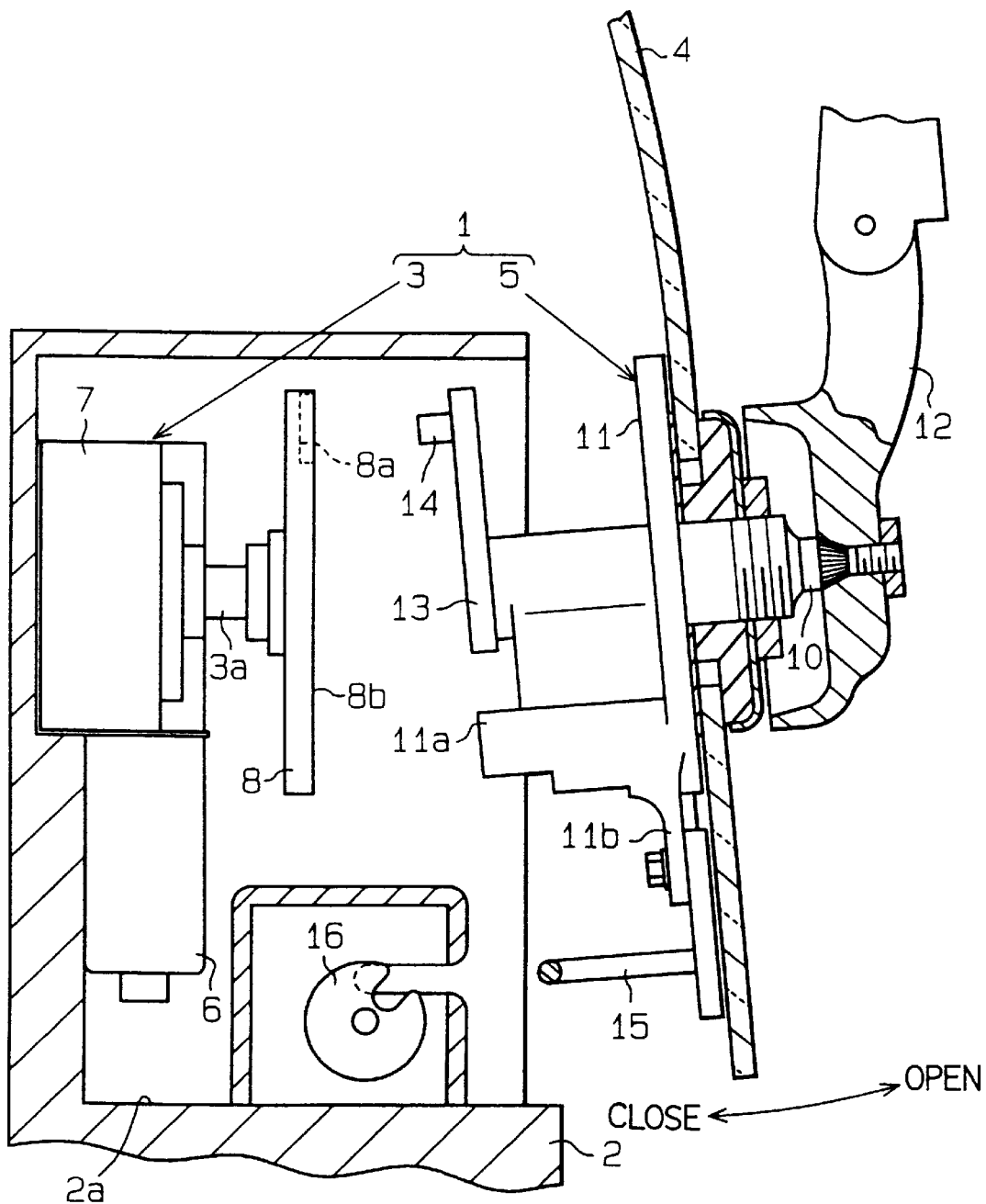
FIG. 2 is a cross sectional view of a wiper device when a window glass is opened.
Figure 3:
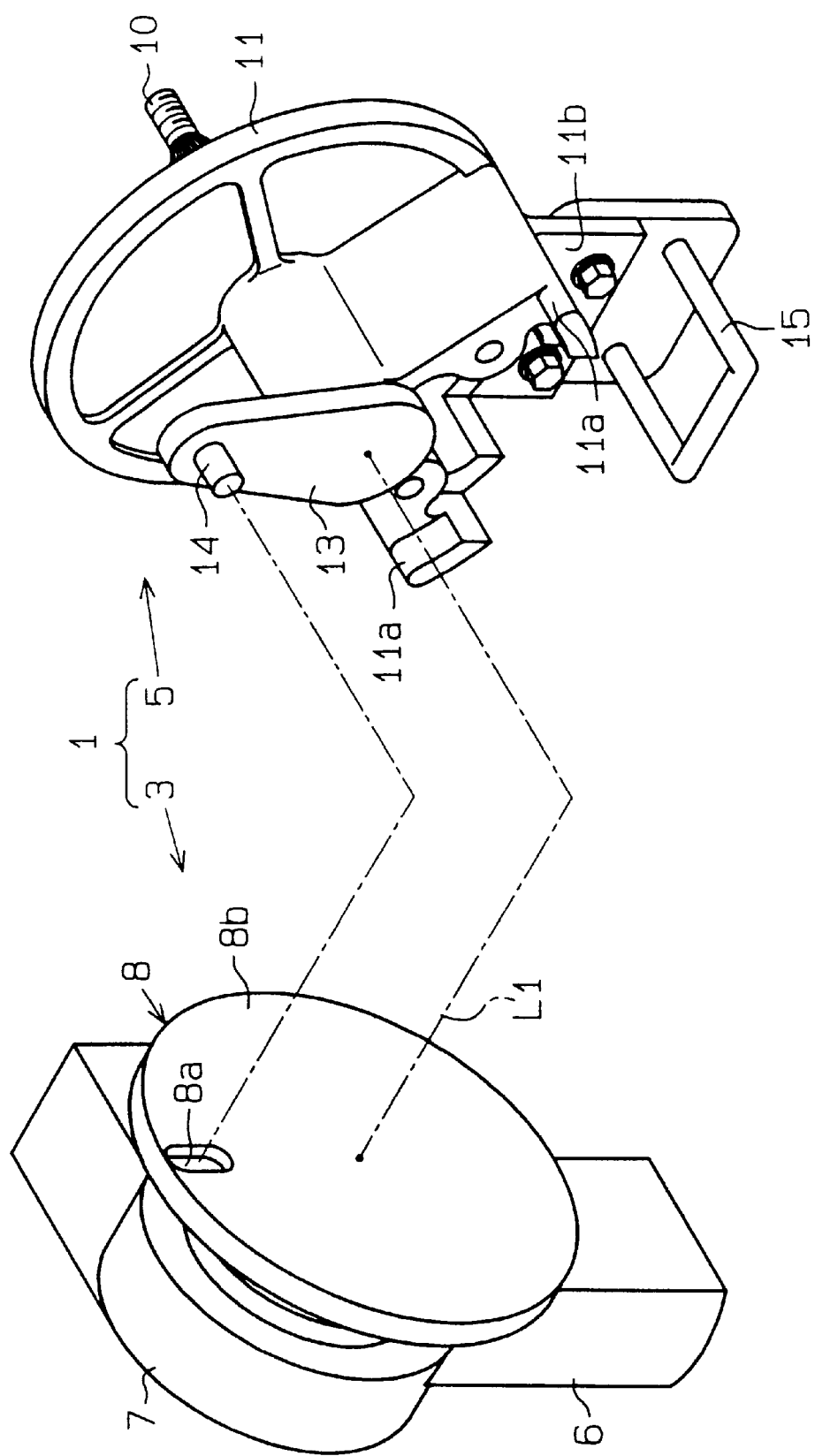
FIG. 3 is an exploded perspective partial view of the wiper device.

A preferred first embodiment of the present invention is described hereinafter according to FIGS. 1 to 7. FIGS. 1 to 3 show a wiper device to which the present invention is applicable. The wiper device 1 wipes a rear window glass openable relative to a rear door 2 (glass hatch type). The wiper device 1 is composed of an actuator 3 fixed to a rear door 2 and a glass side unit 5 fixed to the wind glass 4.

The actuator 3 is composed of a motor 6 and a reduction gear portion 7 and mounted on an installation portion 2a of the rear door 2. A disk plate 8 is fixed to an output shaft 3a of the actuator 3 so that the disk plate 8 may rotate concurrently with the output shaft 3a. A rotating axis of the disk plate 8 coincides with a rotating axis (center axis L1) of the output shaft 3a. The rotation of the motor 6 is transmitted to the disk plate via the reduction gear portion 7 so as to make the disk plate 8 rotate reciprocatingly within a predetermined rotation angle.

The disk plate 8 is provided with a connecting hole 8a having a bottom at a position radially outwardly offset from the center axis L1 of the output shaft 3a, an opening of which faces to the window glass 4. The connecting hole 8a is shaped as a hole with a long side and a short side. The long side is formed along a radial direction of the disk plate 8a and a length of the short side is slightly larger than a diameter of a connecting pin 14 described later.

Figure 4:
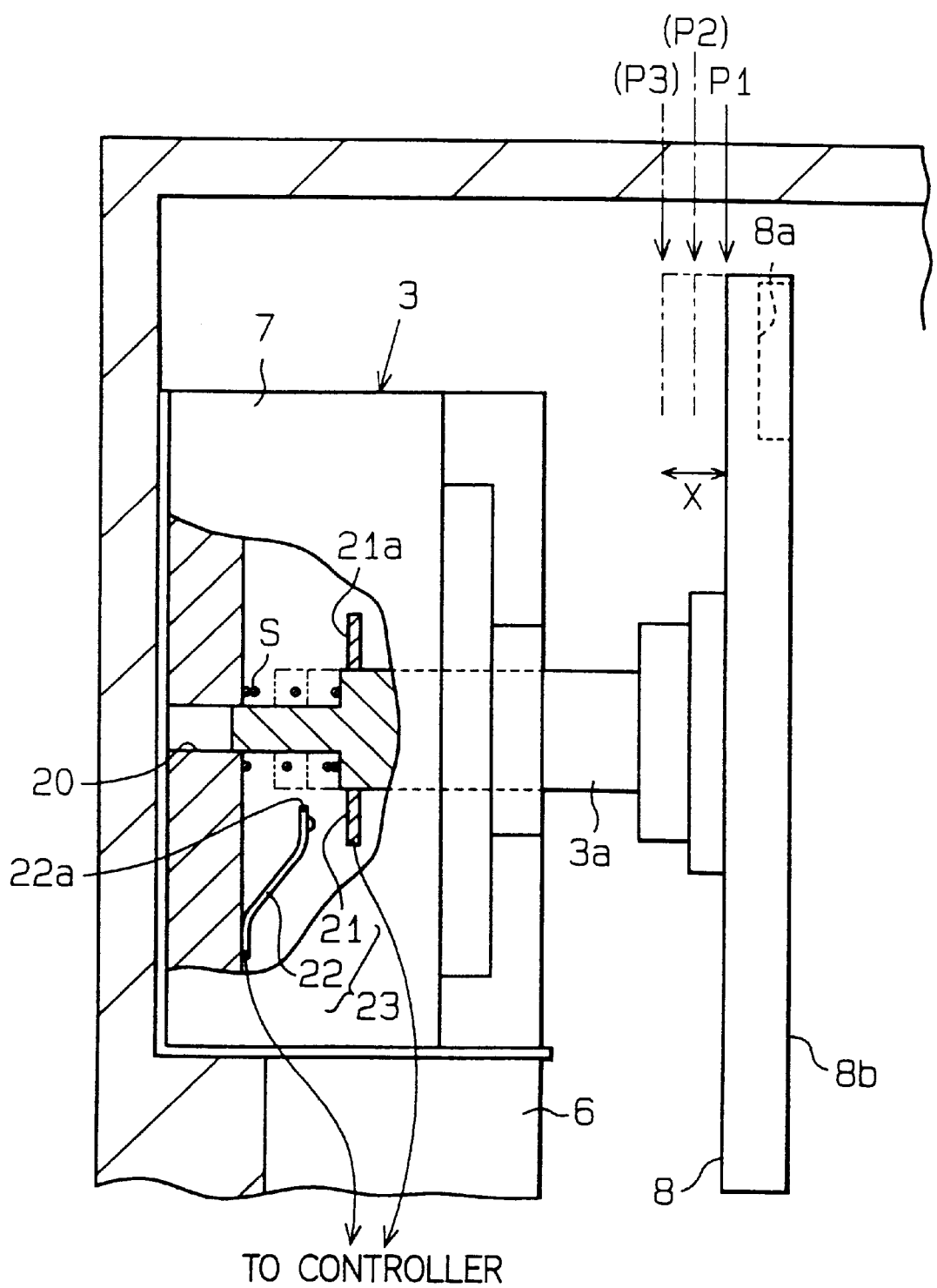
FIG. 4 is a cross sectional partial view of an actuator showing an operation of a switch element.
Figure 5:
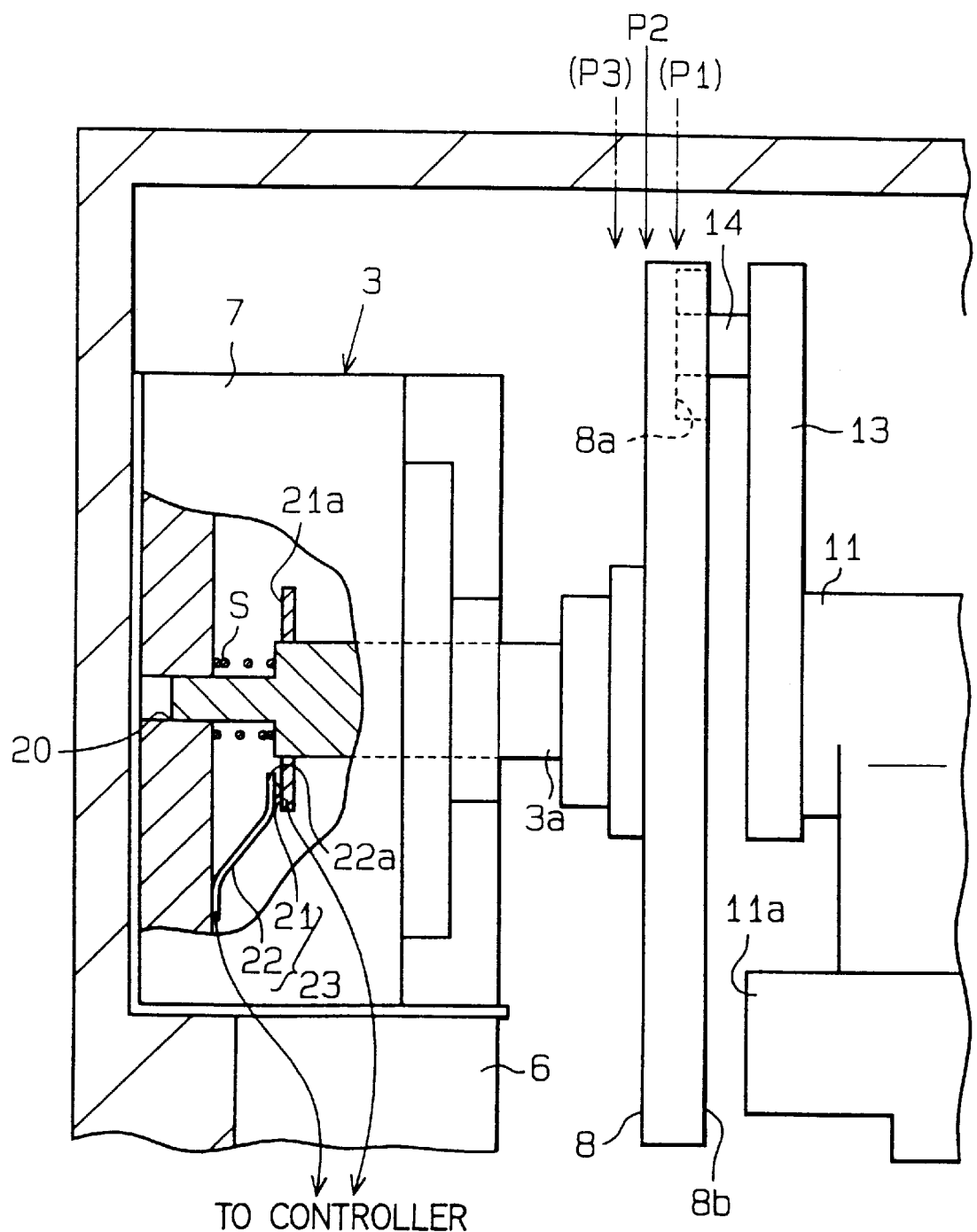
FIG. 5 is a cross sectional partial view of the actuator showing an another operation of the switch element.
Figure 6:
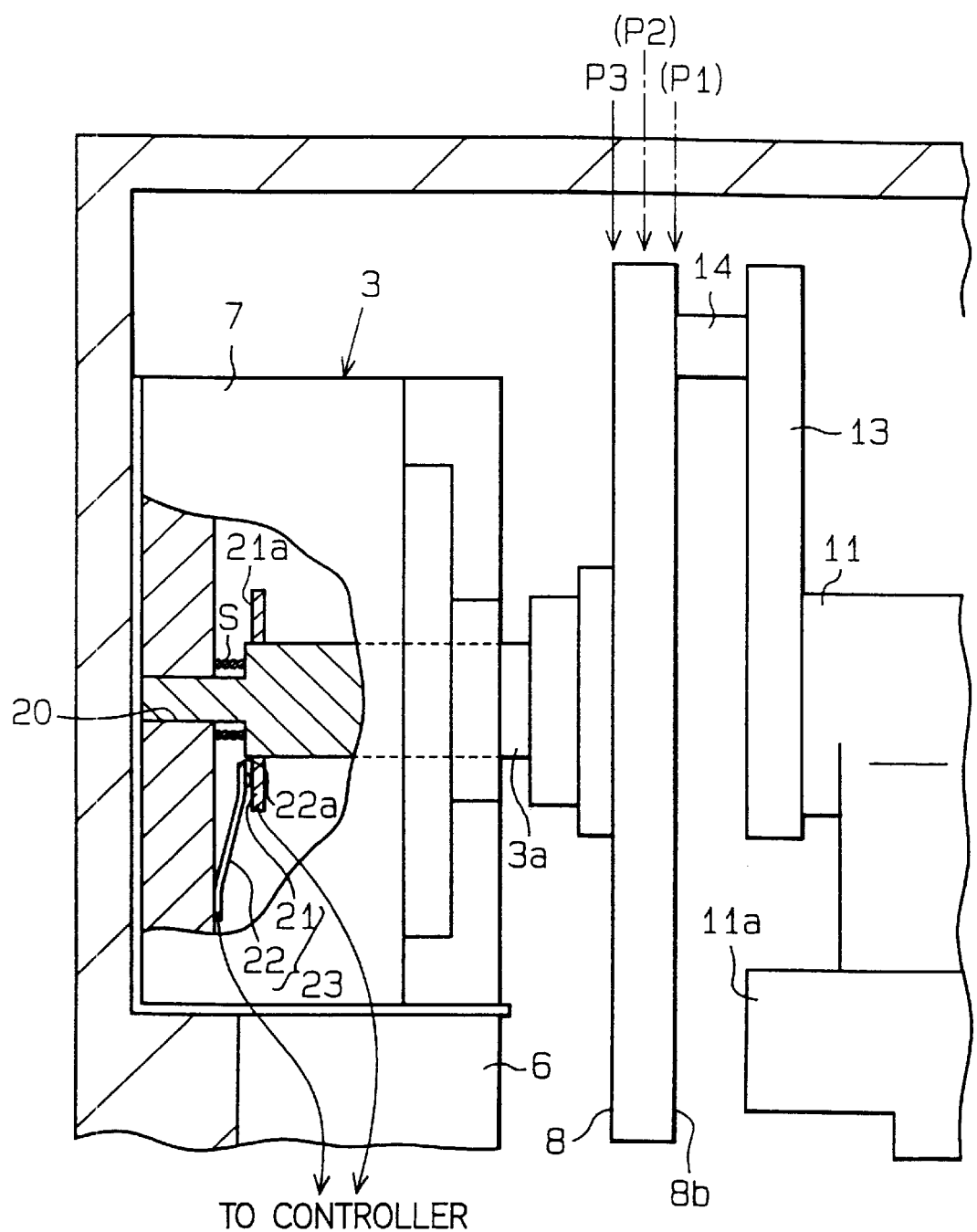
FIG. 6 is a cross sectional partial view of the actuator showing a further operation of the switch element.

As shown in FIGS. 4 to 6, the output shaft 3a together with the disk plate 8 is supported movably in an axial direction by a holding portion 20. The output shaft 3a is biased by a spring S to be urged in a direction of the wind glass 4. A ring shaped conductive plate 21 is attached to the output shaft 3a to be formed in a flange shape. Adjacent the conductive plate 21, located is a contact plate 22 to come in contact and out of contact with a slidable surface 21a of the conductive plate 21. The contact plate 22 is fixed at a base thereof and movable at a leading end thereof along an axial direction. The conductive plate 21 and the contact plate 22 constitute a switch element 23 for detecting whether the wind glass 4 is opened or closed and the switch element 23 is connected in circuit with control means, that is, a controller 24 for controlling the motor 6 or a timer circuit 23, which is described later.

On the other hand, the glass side unit 5 is composed of a pivot shaft 10 penetrating through the window glass 4 and a pivot holder 11 secured to the wind glass 4. The pivot shaft 10 is supported rotatably by the pivot holder 11 in an axis extended from that of the output shaft 3a of the actuator 3. A wiper arm 12 is fixed to an end of the pivot shaft 10 on a side of the outside of the compartment and, at a leading end of the wiper arm 12, a wiper blade (not shown) is mounted for wiping a surface of the window glass 4.

A base of a lever 13 is fixed to another end of the pivot shaft 10 on a side of the compartment (on a side of the actuator 3) and the lever 13 is provided at a leading end thereof with a connecting pin 14 to be fitted into the connecting hole 8a of the disk plate 8. The pivot holder 11 is provided with a stopper 11a with which a side surface of the lever at the leading end comes in contact to restrict a reciprocal rotation movement of the lever 13 within a predetermined rotation angle.

The pivot holder 11 is also provided with a stay portion 11b to which a striker 15 is fixed. A latch mechanism 16 is disposed on the rear door 2 at a place corresponding to the striker 15. The latch mechanism 16 is operative to hold a closing state of the rear window glass 4, once the striker 15 is engaged, and to release to an openable state of the window glass 4 when the striker 15 is disengaged.

As shown in FIG. 4, when the wind glass 4 is kept opened, the connecting pin 14 is not in contact with the disk plate 8 so that the output shaft 3a may be urged by the spring S to a most protruding first position P1 (an end of a moving stroke X of the output shaft 3a). The first position P1 shown in FIGS. 4 to 6, as well as second and third positions P2 and P3 to be described later, is a position of a back side surface of the disk plate 8. At the first position P1, the conductive plate 21 is at a position away from and does not come in contact with the contact plate 22 so that the switch element 23 may be at an off state.

Then, as shown in FIG. 5, when the window glass 4 is moved to be closed and once the connecting pin 14 is fitted into the connecting hole 8a, the connecting pin 14 pushes the bottom of the connecting hole 8a so that the output shaft 3a is moved back to a second position P2 against a biasing force of the spring S. At this position, the conductive plate 21 comes in contact and electrically communicated with the contact plate 22 so that the switch element 23 may be at an on state.

Further, as shown in FIG. 6, if the window glass 4 is moved to be closed and the connecting pin 14 is not fitted into the connecting hole 8a but comes in contact with a surface 8b of the disk plate 8, the connecting pin 14 pushes the surface 8b of the disk plate 8 so that the output shaft 3a is moved back against the biasing force of the spring S to a third position P3 (another end of the moving stroke X of the output shaft 3a) further deep from the second position P2. The electrical communication between the disk plate 21 and the contact plate 22 starts at the second position P2 and continues even at the third position P3 to maintain the on state of the switch element 23.

Figure 7:
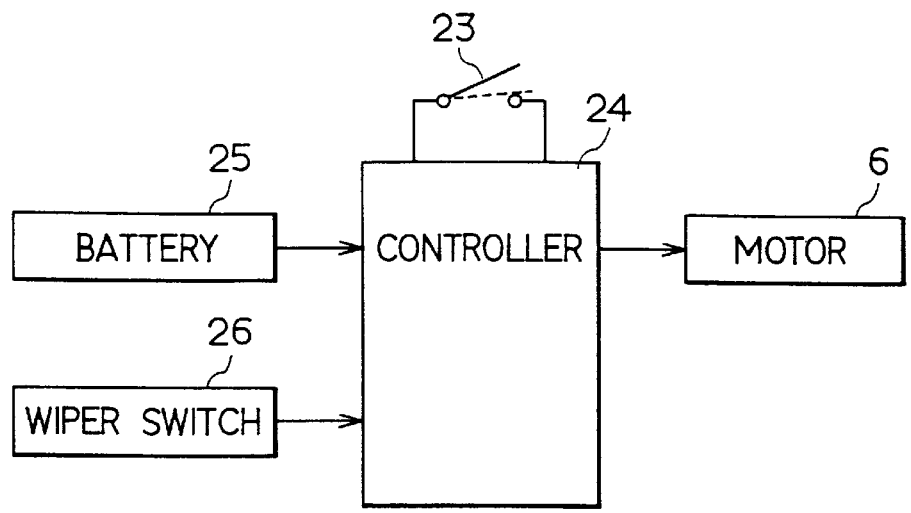
FIG. 7 is a schematic circuit diagram of the wiper device according to the first embodiment.

As shown in FIG. 7, the motor 6 is controlled by a controller 22 mounted on the vehicle and a battery 25 supplies an electric source to the controller 22. A wiper switch 26 arranged at a driver seat and the switch element 23 mentioned before are connected in circuit with the controller 24, respectively. The controller 24 makes the motor 5 operative so as to cause a wiping movement of the wiper arm 12 in responsive to a commanding signal to be generated when the wiper switch 26 is operated. When the controller 24 receives a signal showing the off state of the switch element 23 (first signal), the controller 24 controls the motor 5 in a manner that a power supply to the motor 5 is immediately stopped, even if the wiper switch 26 is turned on, based on a judgement that the window glass 4 is opened. On the other hand, when the controller 24 receives a signal showing the on state of the switch element 23 (second signal), the controller 24 controls the motor 5 in a manner that a power supply to the motor 5 is started with a predetermined time delay after receiving the second signal, if the wiper switch 26 is turned on, based on a judgement that the window glass is closed. A function of the predetermined time delay mentioned above is performed within the controller 24 by executing processes programmed in the controller 24 by a known method.

At a state that the connecting pin 14 is fitted into the connecting hole 8a upon closing the window glass 4, the disk plate 8 and the lever 13 may be driven concurrently. Therefore, when the motor 6 is driven, the disk plate 8 makes an oscillating movement via the reduction gear portion 7 within a predetermined rotation angle and the lever 13 is also oscillated with the same rotation angle as that of the disk plate 8. Then, the pivot shaft 10 is oscillated within the same rotation angle so that the wiper arm 12 may make a reciprocal rotation movement in order for the wiper blade to wipe the surface of the window glass 4 within a given rotation angle.

When the window glass 4 is moved to be open, as shown in FIG. 2, the connecting pin 14 is pulled out from the connecting hole 8a. Therefore, the disk plate 8 together with the output shaft 3a is moved to the first position P1 by the biasing force of the spring S, as the disk plate 8 is not pressed by the connecting pin 14. As a result, the switch element 23 becomes at the off state. That is, when the window glass 4 is opened, the operation of the actuator 3 is immediately stopped by the controller 24 even if the wiper switch is turned on.

When the wind glass 4 is closed, the disk plate 8 and the lever 4 are engaged with each other and the switch element 23 becomes at the on state again. Therefore, the wiping operation of the wiper device 1 may be performed at any time when the wiper switch 26 is turned on and be started with a predetermined time delay after the wind glass 4 is closed by the controller 24.

If the lever 13 is shifted to a rotating direction from a position where the connecting pin 14 is fitted into the connecting hole 8a due to a certain reason, the connecting pin 14 comes in contact with and pushes the surface 8b of the disk plate 8 upon closing the window glass 4. The disk plate 8 is moved back to the third position P3, as shown in FIG. 6, against the biasing force of the spring S. The switch element 23 is turned on when the disk plate 8 passes through the second position P2 and the on state of the switch element 23 is maintained at the third position P3.

When the controller 24 supplies the electrical source to the motor 6, if the wiper switch 26 is turned on, with the predetermined time delay after the disk plate 8 reaches the second position P2, the disk plate 8 is rotated so that the lever 13 may be rotated by a contacting resistance between the connecting pin 14 and the surface 8b of the disk plate 8. However, once the lever 13 comes in contact with the stopper provided in the pivot holder 11, the lever 13 does not rotate any more and only the disk plate 8 is rotated relative to the lever 13, while the connecting pin 14 slides on the surface 8b of the disk plate 8.

At a position where the connecting hole 8a coincides with the connecting pin 14, the connecting hole 8a is coupled with the connecting pin 14 as the disk plate 8 is pushed by the biasing force of the spring S. After the connecting pin 14 is fitted into the connecting hole 8a, the oscillating movement of the disk plate 8 is completely connected with the lever 13 so that the wiper arm 12 may oscillate coincidentally with the disk plate 8 for wiping the surface of the window glass 4.

According to the wiper device 1 mentioned above, the frictional noises, unusual loads or resistance on engaging the lever 13 with the disk plate 13 may be limited when the window door 4 is closed. Further, the wiper device 1 consumes less electrical power since the power supply to the motor 6 is stopped immediately when the window glass 4 is opened.

Furthermore, while the switch element 23 has a simple construction comprising the conductive plate 21 and the contact plate 22, the switch element 23 is incorporated in the actuator 3 to constitute a compact module of the actuator 3 and the switch element 23 so that the installation work for the wiper device 1 to the vehicle may become easier.

Figure 8:
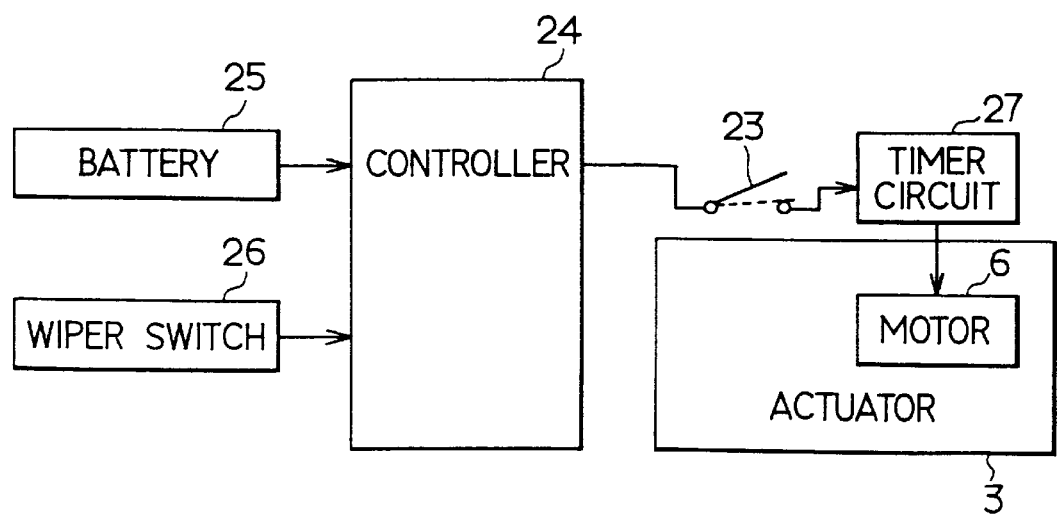
FIG. 8 is a schematic circuit diagram of the wiper device according to a second embodiment.

A second embodiment of the present invention is described with reference to FIGS. 8 and 9. According to the second embodiment, in place of that the switch element 23 is connected in circuit with the controller 24 and the controller 24 programs the function of the predetermined time delay according to the first embodiment, a timer circuit 27 for functioning the predetermined time delay may be provided in the actuator 3 and connected in circuit in series to a power supply circuit from the controller 24 to the motor 6 and the switch element 23 is connected in circuit with the timer circuit 27.

Figure 9:
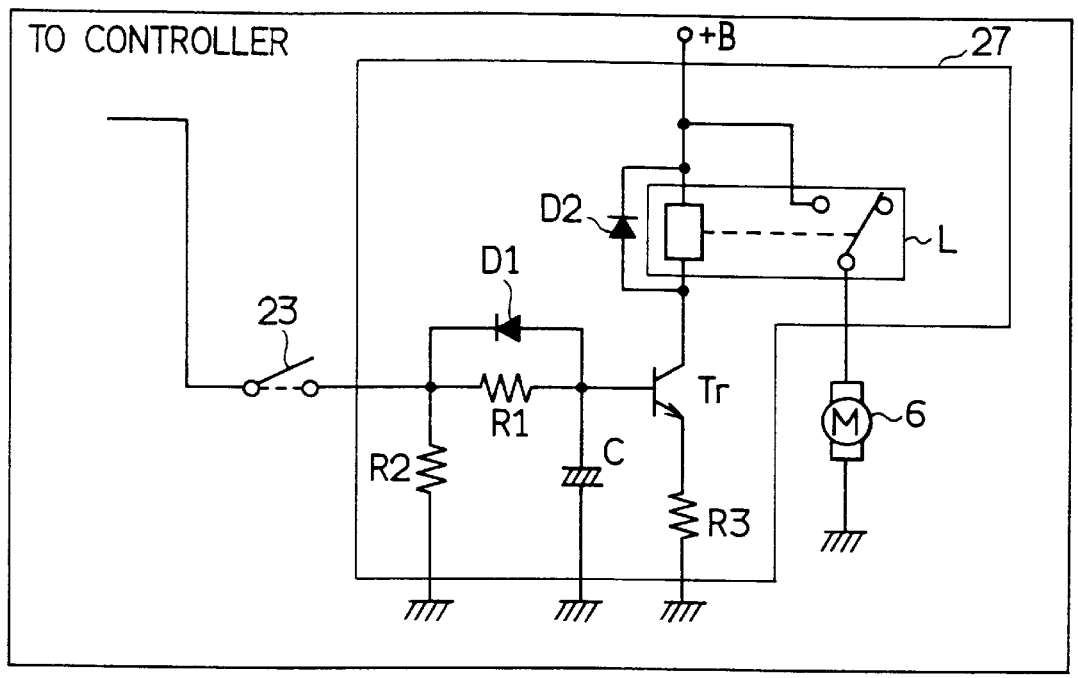
FIG. 9 is a partial electrical circuit according to the second embodiment.

As shown in detail in FIG. 9, the timer circuit 27 is constituted by a relay switch L, a transistor Tr, a capacitor C, resisters R1, R2 and R3 and diodes D1 and D2. The relay switch L is disposed in a power supply circuit from the controller 24 to the motor 6 and the switch element 23 is connected to a base of the transistor Tr via the resister R1. The relay switch L is connected to a collector of the transistor Tr and a relay contact of the relay switch L is positioned so as to break the supply circuit when the transistor Tr is turned off and. However, the relay contact of the relay switch L is attracted by a relay excitation so as to complete the supply circuit when the transistor Tr is turned on.

In case that the wiper switch 26 is turned on and the controller 24 supplies the electric power to the motor 6, the transistor Tr is turned off immediately when the window glass 4 is opened and the switch element 23 is turned off. But, the transistor Tr is turned on with a predetermined time delay (for example, 2 to 3 seconds) when the window glass 4 is closed and the switch element 23 is turned on.

This is because the capacitance stored in the capacitor C is discharged immediately and rapidly through the diode D1 and the resister R2 and through the emitter of the transistor Tr and the resister R3 when the switch element 23 is turned off. On the other hand, when the switch element 23 is turned on, it takes a time until the capacitance of the capacitor C is charged to a certain threshold level in which the transistor Tr may be turned on. The delay time may be decided by a capacitance-resistance time constant of the capacitor C and the resister R1.

As mentioned above, the timer circuit 27 and the switch element 23 are integrally incorporated in the actuator 3, it is not necessary to have a longer wire harness for transmitting the on and off state signals of the switch element 23 located in the rear door to the controller 24 to be generally located near the driver seat.

Figure 10:
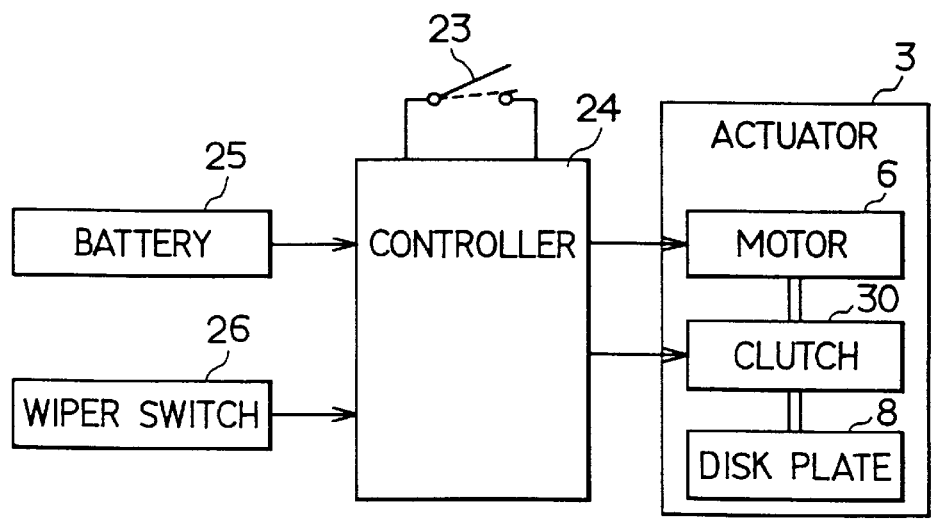
FIG. 10 is a schematic circuit diagram of the wiper device according to a third embodiment.

A third embodiment of the present invention is described with reference to FIG. 10. According to the third embodiment, a clutch 30 is provided between the motor 6 and the disk plate 8 and the driving force of the motor 6 to the disk plate 8 is transmitted normally but interrupted only when the clutch 30 is energized. The clutch 30 and the motor 6 are connected in circuit with the controller 24, respectively. According to the first embodiment, when the wiper switch 26 is turned on, the electrical power supply of the controller 24 to the motor 6 is stopped immediately after the window glass 4 is opened and started with the predetermined time delay after the window door is closed.

However, according to the third embodiment, when the wiper switch 26 is turned on, the controller 24 always supplies the electrical source to the motor 6 and serves to start energizing the electrical clutch 30 immediately after the window glass 4 is opened (after receiving the off state signal of the switch element 23) and to stop energizing the electrical clutch 30 with the predetermined time delay after the window glass 4 is closed (after receiving the on state signal of the switch element 23). As a result, the driving force transmission from the motor 6 to the disk plate 8 is stopped immediately after the window glass 4 is opened and started with the predetermined time delay after the window glass 4 is closed because of the operation of the clutch 30.

Figure 11:
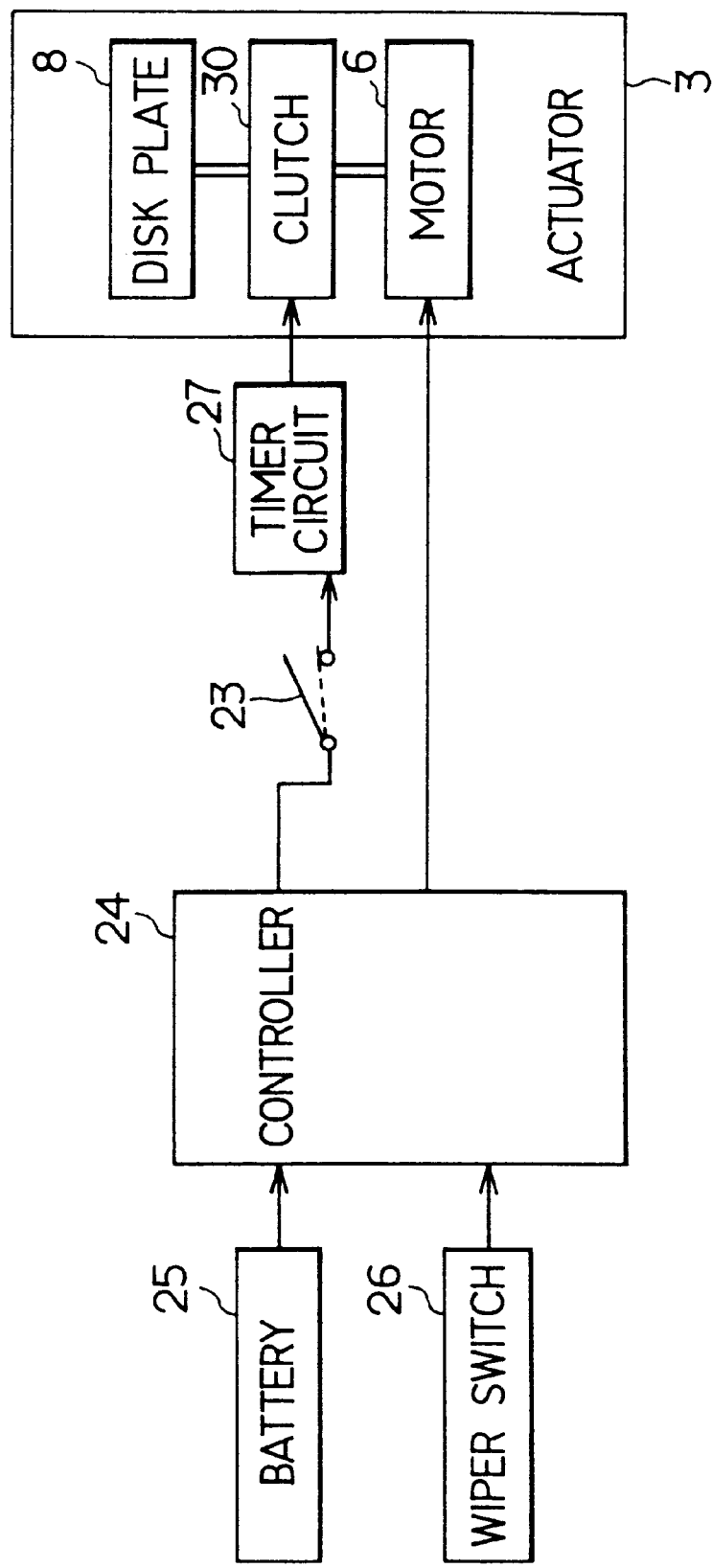
FIG. 11 is a schematic circuit diagram of the wiper device according to a fourth embodiment.

A fourth embodiment of the present invention is described with reference to FIG. 11. A clutch 30 is provided between the motor 6 and the disk plate 8 and the driving force of the motor 6 to the disk plate 8 is transmitted normally but interrupted only when the clutch 30 is energized. A timer circuit 27 is connected in circuit with the clutch 30 and the switch element 23 is connected in circuit with the timer circuit 27. The motor is connected in circuit directly with the controller 24.

According to the fourth embodiment, when the wiper switch 26 is turned on, the timer circuit 27 is operative to start energizing the clutch 30 so as to have the driving force transmission from the motor 6 to the disk plate 8 stop immediately after the window glass 4 is opened (after receiving the off state signal of the switch element 23) and to stop energizing the clutch 30 so as to have the driving force transmission from the motor 6 to the disk plate 8 start with a predetermined time delay after the window glass 4 is closed (after receiving the on state signal of the switch element 23).

As mentioned above, the clutch 30, the timer circuit 27 and the switch element 23 are integrally incorporated in the actuator 3, it is not necessary to have a longer wire harness for transmitting the on and off state signals of the switch element 23 to the controller 24.

Figure 12:
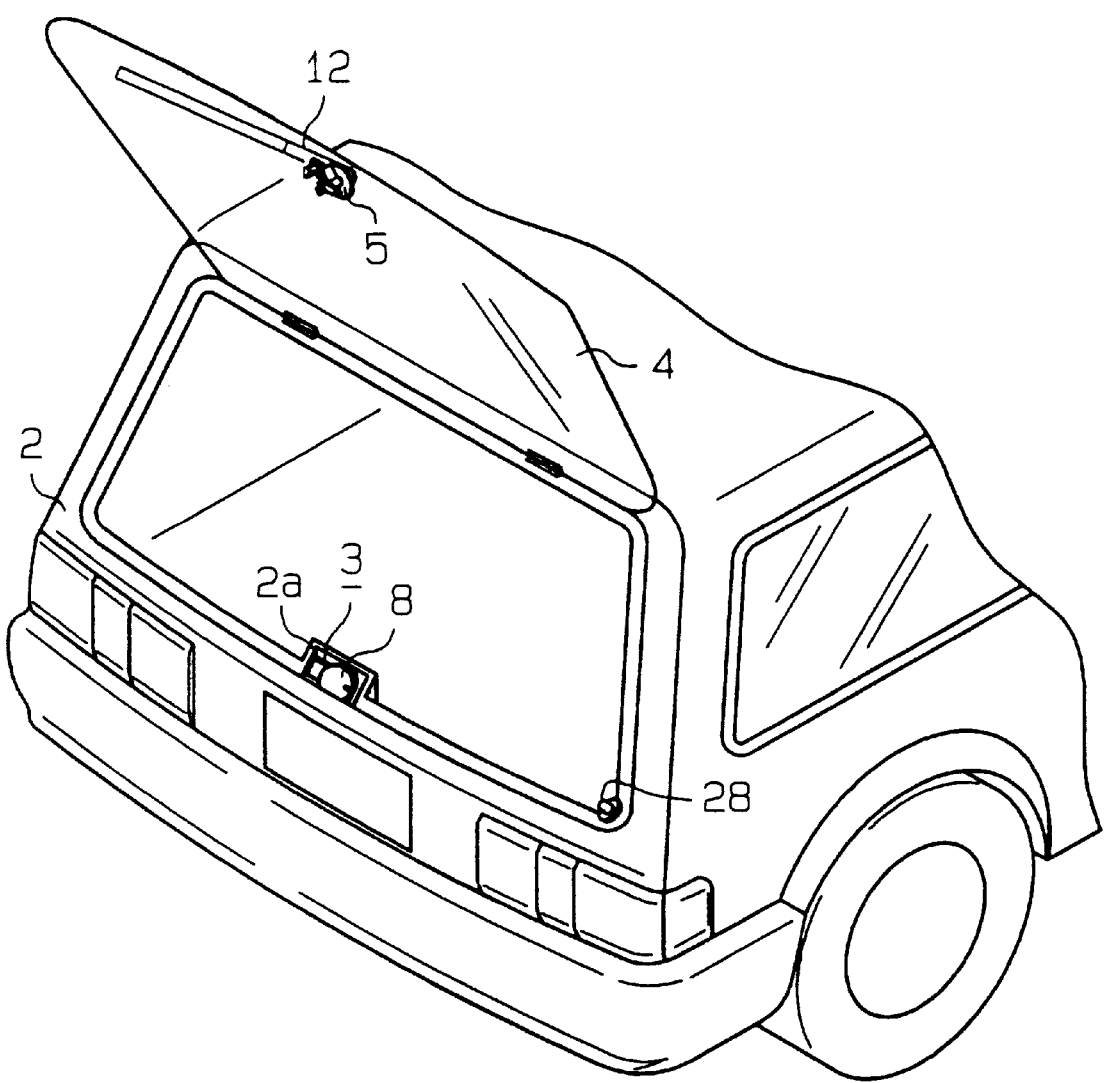
FIG. 12 is a perspective view of a rear door portion of vehicles.

In the first to fourth embodiments mentioned, the switch element 23 is incorporated in the actuator 3. However, the switch element 23 may be located at the other place such as at the rear door 2 as shown in FIG. 12. The switch element 23 may be used also for displaying in an instrument panel a caution sign of an opening state of the window glass 4.

Further, a construction of engaging and disengaging the actuator 3 with the glass side unit 5 is not limited to the disk plate 8 with the connecting hole 8a and the lever 13 with the connecting pin 14 but may be an any other coupling for transmitting the motion of the motor 6 to the pivot shaft 10.

Furthermore, though the rotary motion of the motor 6 is converted to the oscillating motion of the disk plate 8 in the actuator 3 according to the embodiments mentioned above, as an alternative embodiment, it is possible to have a construction that the actuator transfers the rotary motion of the motor to the glass side unit and the glass side unit is provided with a conversion mechanism such as a link mechanism for converting the rotary motion to the oscillating motion to have the wiper arm reciprocatingly move within the predetermined rotation angle.

What is claimed is:

1. A wiper device for a window glass openable relative to a vehicle body comprising;
    a pivot shaft having a wiper arm and blade assembly at an end thereof and an a pivot shaft coupling member at another end thereof;
    a pivot holder secured to the window glass for rotatably holding the pivot shaft;
    an actuator fixed to the vehicle body for driving the pivot shaft so that the wiper arm and blade assembly may wipe a surface of the window glass, the actuator having an actuator power source for generating a driving force and an actuator coupling member engageable and disengageable with the pivot shaft coupling member so as to transmit and interrupt the driving force of the actuator power source to the pivot shaft;
    control means connected in circuit with the actuator for controlling an operation of the actuator; and
    a switch element connected in circuit with the control means for generating a first signal when the window glass is opened and a second signal when the window glass is closed,
    wherein the control means controls the actuator in such a manner that driving the pivot shaft is stopped immediately upon receiving the first signal and is started with a certain time delay after receiving the second signal.

2. A wiper device according to claim 1, wherein the control means has time delay means connected in circuit with the switch element, the time delay means being so operative that an electric power supply to the actuator power source may be stopped immediately upon receiving the first signal and may be started with a predetermined time delay after receiving the second signal.

3. A wiper device according to claim 2, wherein the control means has a controller, the actuator power source has a wiper motor and the time delay means has a timer circuit assembled in the actuator, and, further, wherein the controller, the timer circuit and the wiper motor constitutes a series circuit that may break immediately when the timer circuit receives the first signal and complete with a predetermined time delay when the timer circuit receives the second signal.

4. A wiper device according to claim 2, wherein the control means has a controller, the actuator power source has a wiper motor connected in circuit with the controller and the time delay means is incorporated in the controller for software processing so that the electric power supply to the wiper motor may be stopped immediately when the controller receives the first signal and be started with a predetermined time delay. when the controller receives the second signal.

5. A wiper device according to claim 1, wherein the control means has time delay means connected in circuit with the switch element and the actuator has an electrical clutch operative for making the actuator power source engagable and disengageable with the actuator coupling member, the time delay means controlling the electrical clutch in such a manner that the driving force of the actuator power source to the actuator coupling member may be interrupted immediately upon receiving the first signal and be transmitted with a predetermined time delay after receiving the second signal.

6. A wiper device according to claim 5, wherein the control means has a controller, the actuator power source has a wiper motor connected in circuit with the controller and the delay means has a timer circuit assembled in the actuator and connected in circuit with the electrical clutch for controlling the electrical clutch, and, further, wherein the controller, the timer circuit and the electrical clutch constitutes a circuit for starting energizing the electrical clutch immediately when the timer circuit receives the first signal and stopping energizing the electrical clutch with a predetermined time delay when the timer circuit receives the second signal.

7. A wiper device according to claim 5, wherein the control means has a controller, the actuator power source has a wiper motor and the time delay means- is incorporated in the controller for software processing so that an electric supply to the electrical clutch may be started immediately when the controller receives the first signal and be stopped with a predetermined time delay when the controller receives the second signal.

8. A wiper device according to claim 1, wherein the switch element is disposed at the actuator and operative in response to a movement of the actuator coupling member relative to the actuator power source, the switch element generating the first signal when the actuator coupling member is moved through a predetermined position in a direction away from the actuator power source and the second signal when the actuator coupling member is moved back through the predetermined position in a direction near to the actuator power source.

9. A wiper device according to claim 1, wherein the switch element is disposed at the vehicle body so as to make operative in response to a movement of the window glass relative to the vehicle body, the switch element generating the first signal when the wind glass is moved through a predetermined position in a direction away from the vehicle body and the second signal when the wind glass is moved back through the predetermined position in a direction near to the vehicle body.

10. A wiper device according to claim 9, wherein at least the first signal generated by the switch element is used as an input signal for cautioning visually a state that the wind glass is opened.

11. A wiper device according to claim 1, wherein the actuator has an output shaft of the actuator power source movable in an axial direction thereof and reciprocatingly rotatable within a predetermined rotation angle and a biasing element biasing the output shaft to move in a direction away from the actuator power source, further
wherein the actuator coupling member has a disk plate concentrically mounted on the output shaft, the disk plate being provided with a connecting hole at a position radially outwardly offset from a center axis of the output shaft, and the pivot shaft coupling member has a lever fixed to the another end of the pivot shaft, the lever being provided with a connecting pin to be fitted into the connecting hole and the disk plate together with the output shaft being moved back from a first position to a second position by the lever and the connecting pin against a biasing force of the biasing element when the window glass is closed and, furthermore,
wherein the switch element is disposed at the actuator power source and generates the first signal when the output shaft is moved through the second position to the first position by the biasing force of the biasing element and the second signal when the output shaft is moved back through the second position from the first position.

\* \* \* \* \*